US005931033A

United States Patent [19]

Lanigan et al.

[11] Patent Number: 5,931,033

[45] Date of Patent: Aug. 3, 1999

[54] SECURITY SYSTEM WITH IMPROVED LOCK ASSEMBLY

[76] Inventors: William P. Lanigan, 16946 Blue Heron Dr., Orland Park, Ill. 60462; Peter W. Mirabella, 7647 Starling Dr., Schererville, Ind. 46375

[21] Appl. No.: 08/895,882

[22] Filed: Jul. 17, 1997

[51] Int. Cl.[6] ........ B60R 25/00

[52] U.S. Cl. ........ 70/256; 292/97; 292/196; 292/DIG. 53; 292/DIG. 25; 70/451; 70/137

[58] Field of Search ........ 70/256, 135, 136, 70/137, 138, 139, 451; 292/196, 197, 97, 98, 227, DIG. 25, DIG. 71, 201, DIG. 53; 109/50–52

[56] References Cited

U.S. PATENT DOCUMENTS

| | | | |
|---|---|---|---|
| 2,325,225 | 7/1943 | Burke | 292/DIG. 49 |
| 3,751,088 | 8/1973 | Schlage et al. | 292/201 |
| 4,056,276 | 11/1977 | Jarvis | 292/DIG. 49 |
| 4,613,176 | 9/1986 | Kelly | 292/DIG. 49 |
| 4,998,758 | 3/1991 | Kowalczyk et al. | 292/DIG. 25 |
| 5,058,939 | 10/1991 | Miilu | 292/DIG. 49 |
| 5,076,625 | 12/1991 | Oxley | 292/201 |
| 5,490,697 | 2/1996 | Surko, Jr. | 292/DIG. 71 |
| 5,532,521 | 7/1996 | Leininger | 70/256 |
| 5,630,631 | 5/1997 | Iwamoto et al. | 292/150 |
| 5,760,703 | 6/1998 | Becker | 70/278 |

*Primary Examiner*—Darnell M. Boucher

[57] ABSTRACT

A security system for cargo loading doors, comprising: a substantially narrow profile housing adapted to being connected to an inside of a cargo loading door; an actuator having a key receptacle, for moving a latch structure between a locked position and an unlocked position; the latch structure and the actuator being coupled by a linkage mechanism and plunger assembly, the latch structure is adapted to be at least partially received in a header of at least one of a cargo carrying enclosure, such as an ISO container, domestic container, semi-trailer and the like, when the latch structure is in the locked position and withdrawn from the header when the latch structure is in the unlocked position; and the linkage mechanism includes a distal section and a proximal section connected by a middle pivot pin, the distal section is coupled to the latch structure with an upper pivot pin and the proximal section is coupled with the plunger assembly, the proximal section is also pivotably connected to the housing with a stationary pivot pin, the linkage mechanism defines a simulated rigid link defined by the proximal section and distal section being substantially aligned when the latch structure is in the locked position.

18 Claims, 5 Drawing Sheets

Fig 5
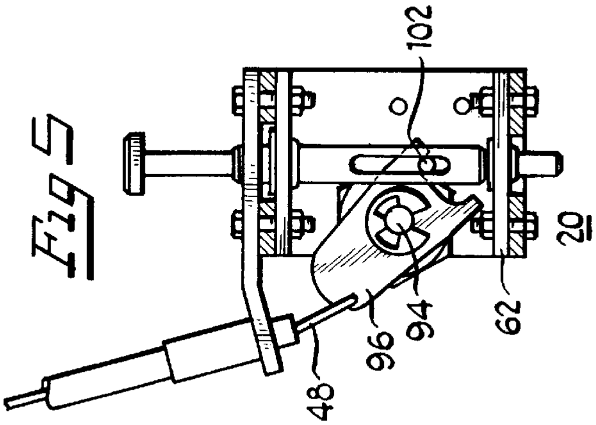
Fig 7
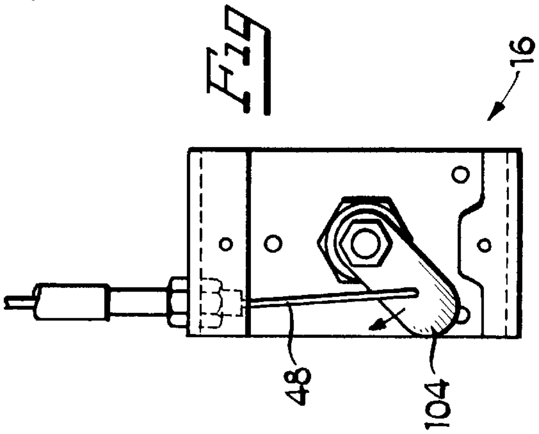
Fig 4
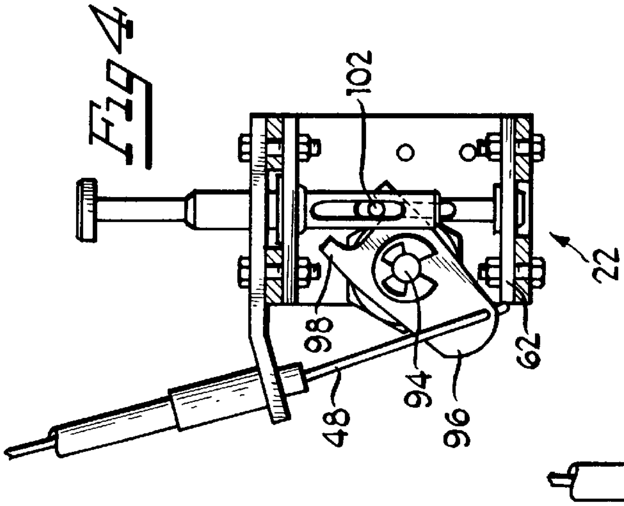
Fig 3
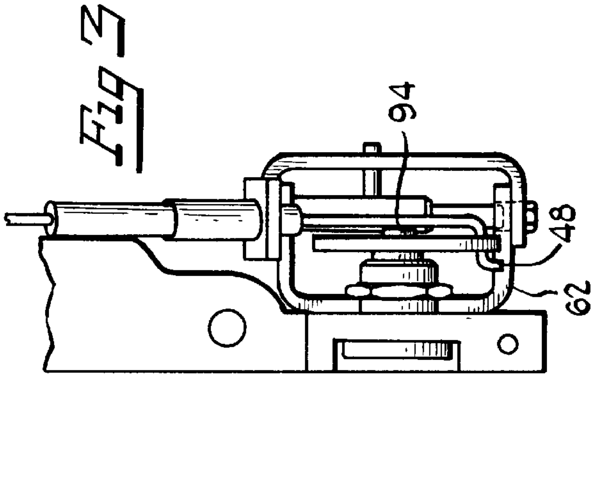
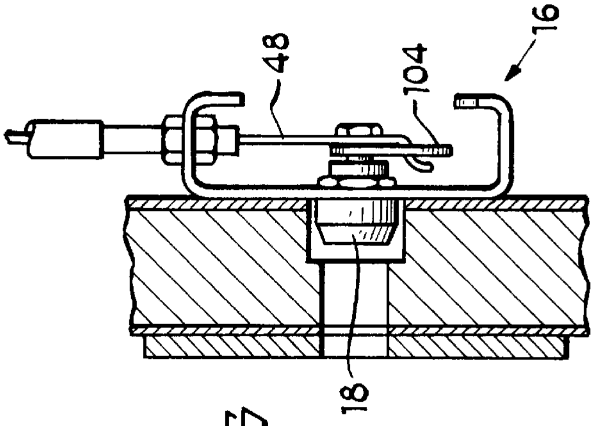
Fig 6

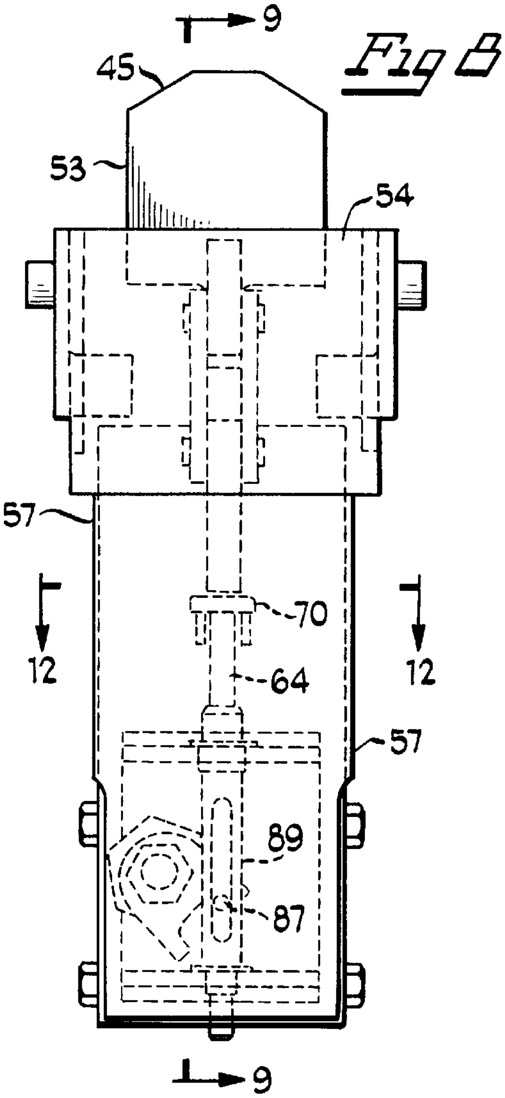
Fig 8
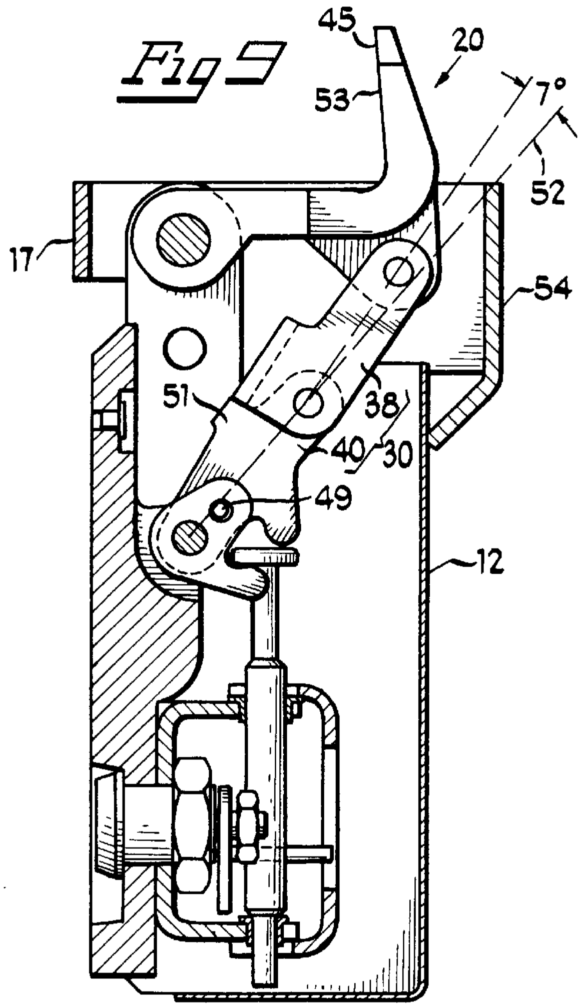
Fig 9
Fig 11
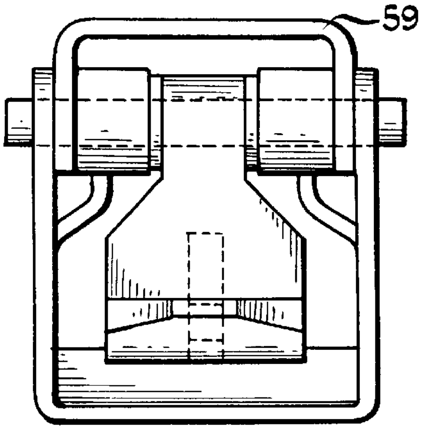
Fig 12
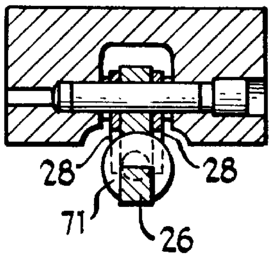

SECURITY SYSTEM WITH IMPROVED LOCK ASSEMBLY

FIELD OF THE INVENTION

This invention relates to security systems, and particularly to retrofitable and factory installable security systems with an improved lock assembly.

BACKGROUND OF THE INVENTION

Security for trailers, ISO containers, domestic containers, cargo carrying containers and the like has been quite poor, usually consisting of a padlock and/or seal having an exposed link which can be cut by bolt cutters or equivalent tools. Thus, semi-trailers, containers and trucks left unattended for any length of time, as over night in truck terminals, intermodal terminals and freight yards, on shipping docks and piggy-back railroad cars, or at industrial or commercial loading areas (and during transit), are vulnerable to thievery and pilferage.

The problem of vulnerability of externally located closure means may be minimized, through the employment of a retrofitable or factory installed security system adapted to be located within a container, where it is not clearly visible and accessible to a would be thief or opportunist.

There is an ever demanding requirement for improved security systems for cargo loading doors and enclosures for the worldwide transportation industry.

BRIEF DESCRIPTION OF THE DRAWINGS

FIG. 3 is a partial view of the security system in FIG. 1 showing a partial, side view of the lock housing with many components therein, in accordance with the present invention;

FIG. 4 is a partial view of the security system in FIG. 1 showing a partial, front view of an internal portion of the housing when in an unlocked position, in accordance with the present invention;

FIG. 5 is a partial view of the security system in FIG. 1 showing a partial, front view of an internal portion of the housing when in a locked position, in accordance with the present invention;

FIG. 6 is a partial view of the security system in FIG. 1 showing a partial, top view of the remote key receptacle, in accordance with the present invention; and FIG. 7 is a partial view of the lock assembly in FIG. 1 showing a partial, side view of the remote key receptacle, in accordance with the present invention.

FIG. 8 is a front view of the security system for cargo loading doors in FIG. 2, showing the lock housing with an internal key receptacle, in accordance with the present invention;

FIG. 9 is a sectional view of the security system for cargo loading doors in FIG. 8, along lines 9—9, showing the lock housing with an internal key receptacle in a locked position (FIG. 2 is in the unlocked position), in accordance with the present invention;

FIG. 10 is a planar, outside view of a container, trailer or other similar enclosed body, showing the embodiment of the security system for cargo loading doors in FIG. 1, showing an exemplary placement of a lock housing with a remote key receptacle coupled with a push-pull cable, in accordance with the present invention;

FIG. 11 is a top view of the security system for cargo loading doors in FIG. 8, in accordance with the present invention;

FIG. 12 is a sectional view of the security system for cargo loading doors in FIG. 8, along lines 12—12, showing part of a C-shaped member and plunger assembly, in accordance with the present invention;

DETAILED DESCRIPTION OF THE PREFERRED EMBODIMENT

Figure 1D:
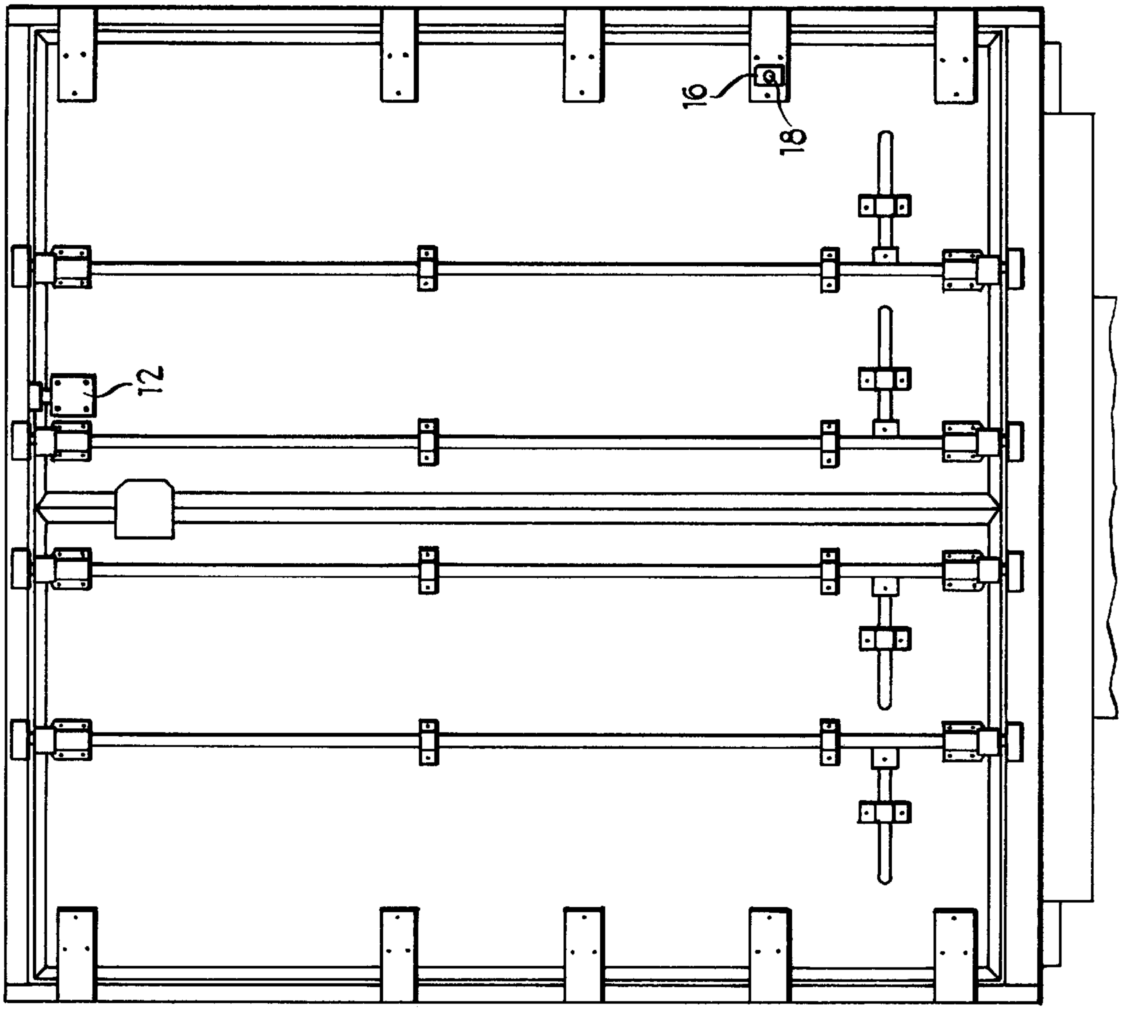
FIG. 1 is a rear, inside view of a container or other similar enclosed body, showing one embodiment of a security system for cargo loading doors showing a lock housing with a remote key receptacle coupled with a push-pull cable, in accordance with the present invention.

A security system with an improved lock assembly 10 is shown in the figures, and is particularly adapted for use in connection with cargo loading doors. In one embodiment, the security system 10, includes: a substantially narrow profile housing 12 adapted to being connected to an inside of a cargo loading door 14; an actuator 16 having a key receptacle 18, for moving a latch structure between a locked position 20 and an unlocked position 22; the latch structure 30 and the actuator 16 being coupled by a linkage mechanism 32 and plunger assembly 34, the latch structure 30 is adapted to be at least partially received in a header 36 of at least one of an ISO container, domestic container, semi-trailers, cargo carrying enclosures and the like, when the latch structure 36 is in the locked position 20 and withdrawn from the header 36 when the latch structure 36 is in the unlocked position 22; and the linkage mechanism 32 includes a distal section 38 and a proximal section 40 connected by a middle pivot pin 42, the distal section 38 is coupled to the latch structure 30 with an upper pivot pin 44 and the proximal section 40 is coupled with the plunger assembly 34, the proximal section 40 is also pivotably connected to the housing 12 with a stationary pivot pin 46, the linkage mechanism 32 defines a simulated rigid link defined by the proximal section 40 and distal section 38 being substantially aligned when the latch structure 30 is in the locked position 20.

Advantageously, the security system 10 is configured to be tamper resistant because of it's placement which is substantially internal to a container. In addition, system 10 has a narrow profile to minimize intrusion into the valuable cargo space of the container.

In one embodiment, only one housing 12 with latch structure 30 is necessary, to lock two doors when utilized with a door retainer or the like, which provides simplicity of design. As should be understood, other embodiments can include a plurality of housings and latch structures.

As should be understood, the system 10 can be used with roll down doors, swing out doors and the like, depending on the application.

Figure 1:
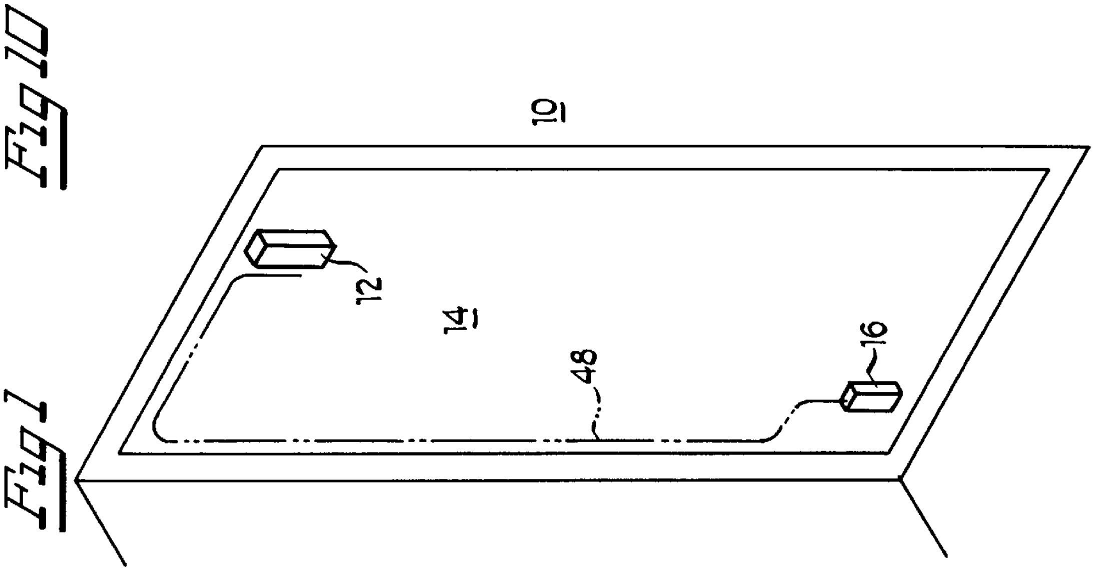

In a preferred embodiment, the housing 12 is adapted to be connected to an inside of a cargo loading door, such as positioned at the top right corner, as shown in FIG. 1. This remote placement is out of the way so as not to interfere with the loading and unloading operation. Additionally, the strategic positioning and locations f the components in FIG. 1, provide an improved tamper resistant security system, preferably with internal placement of system 10, so as to be visually hidden from an opportunist or thief. With the housing 12 near a top of the door, it is more difficult to gain easy access, by a would be thief.

Figure 15:
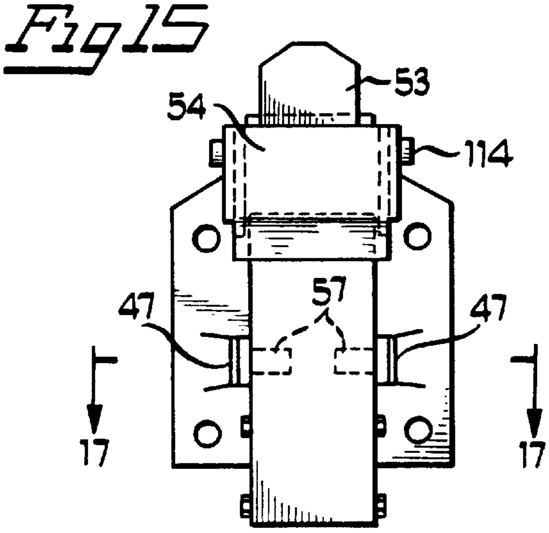
FIG. 15 is a partial front view of the security system in FIG. 1 showing a universal adapter comprising a base plate and housing with a slidable and snap fitable arrangment connectable with the base plate, in accordance with the present invention.
Figure 16:
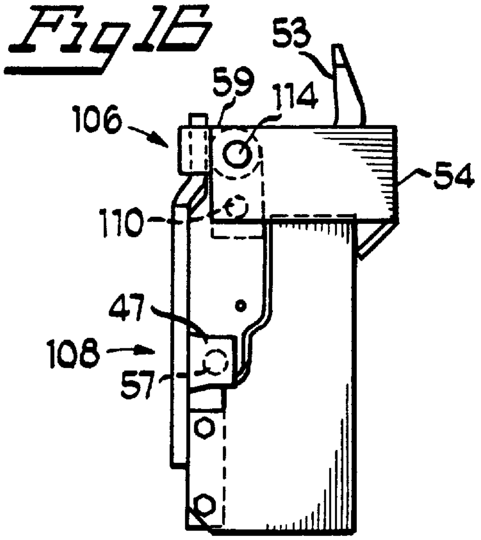
FIG. 16 is a side view of the security system in FIG. 15 showing a universal adapter comprising a base plate and housing with a slidable and snap fitable arrangment connectable with the base plate, in accordance with the present invention.

As best shown in FIGS. 15 and 16, a universal adapter comprising a base plate and housing with a slidable and snap fitable arrangment connectable with the base plate is shown. This arrangement provides for ease of installation, assembly and maintainance. In a preferred embodiment the housing 12 includes a guard 54 for the latch, for protection from damage from shifting loads, for example. Also in a preferred embodiment, the housing 12 includes a base plate 60 ( FIGS. 15 and 16) with an upwardly-extending male member and a bracket or slip on member 59, slidably connected thereto and complementarily configured therewith, and the housing 12 can have snap-fitable members, such as spring loaded locking members 57 connected with outwardly extending anchor members 47 of the base plate 60.

Figure 2:
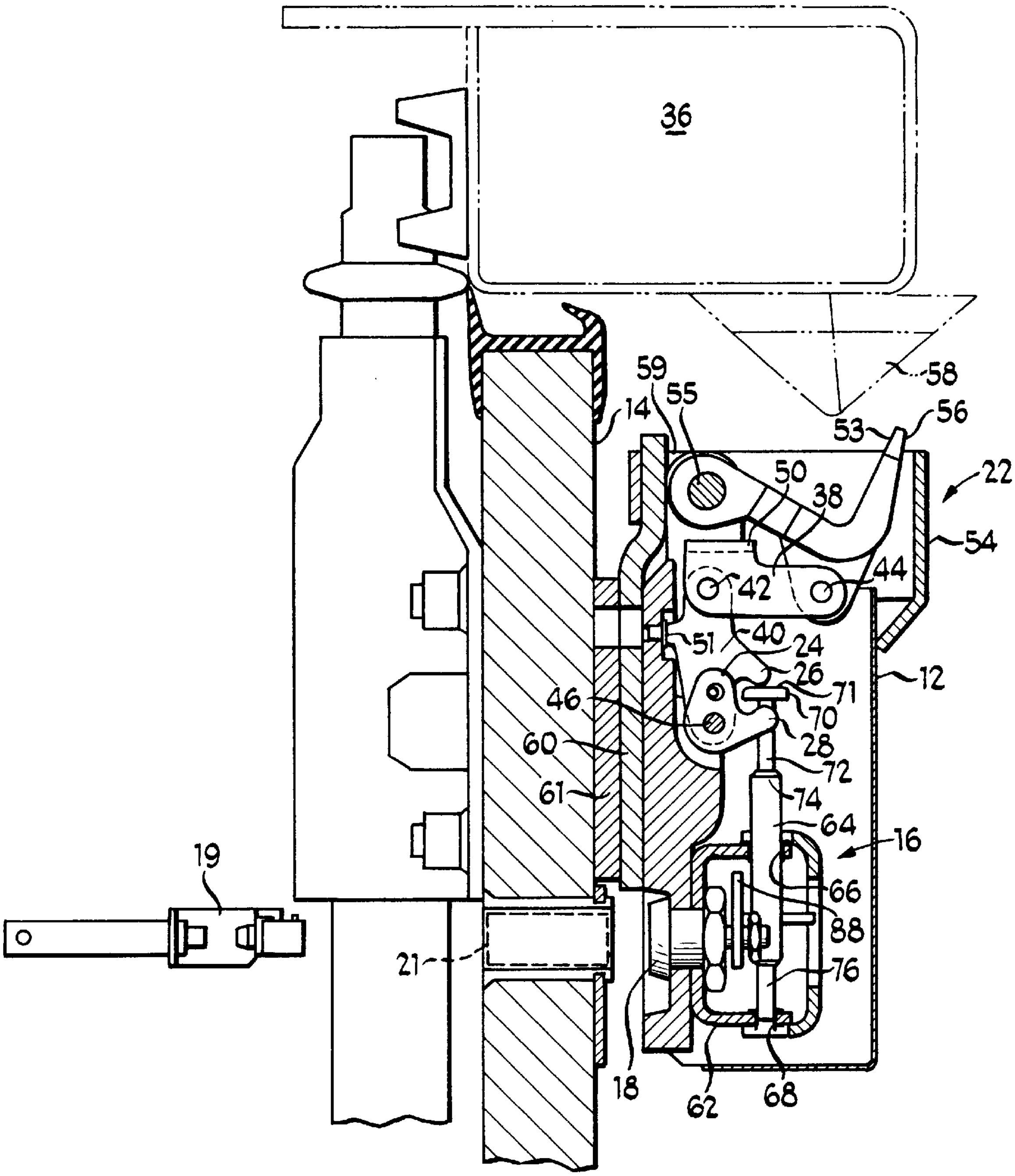
FIG. 2 is a side, cut-away view of another embodiment of a security system for cargo loading doors showing a lock housing with an internal key receptacle, in accordance with the present invention.

The housing 10 can be slip fit and snap connected in place, to a base plate 60 on the door, in one embodiment. Also in one embodiment, a shock pad 61 can be provided, to help minimize shock and vibration to housing 10 and the associated components FIG. 2. Also shown in FIG. 2, is a slip on member 59 and spring loaded plunger 57, for facilitating connection and installation of the system 10. And, a bumper 51 is shown on the linkage mechanism 32, so as to minimize the possibility of the linkage mechanism 32 from locking up and softening the impact between the linkage mechanism 32 and housing 12, when moved to the unlocked position. The key receptacle (actuator) 18 can be a high security tubular lock, such as Part No. 1058 or the like available from Fort Lock, Inc. in River Groove, Ill. Likewise, the push-pull cable 48 can be a solid core control cable known to those skilled in the art, with a stainless steel core, such as Part No. CC-5210XX, available from Cable Manufacturing and Associates, Inc. in Rockaway, N.J.

The system 10 can be retrofitted or factory installed, thus minimizing the need for cutting, drilling or welding during installation.

The proximal or distal sections 40 and 38 includes a stopper mechanism 50 for aligning the linkage mechanism 32 to provide a substantially rigid link when the latch structure 30 is in the locked position 20, the stopper mechanism 50 aligns the proximal section 40 with the distal section 38 slightly beyond center (shown in dashed line in FIG. 9) 52 from a straight line, defining a slight angle of about 15 degrees or less from a straight line and providing a simulated rigid link.

In one embodiment, the angle ranges from about 10 degrees to about 5 degrees from a straight line, as shown for example in FIG. 9, and most preferably about 7 degrees, for an improved rigid link. A simulated rigid and off-center link is an improvement over a straight line link in that it has enhanced tamper resistant qualities, and helps to ensure isolation of forces through the housing. Advantageously, this structure helps transfer forces from the L-shaped member 54 to the housing 12 during tampering, while also providing the appropriate functionality, as detailed herein.

As shown in FIG. 9, the L-shaped member 54 has an inner surface 53 configured at a predetermined angle form a vertical axis. In one embodiment, the angle ranges from about 15 or less from a vertical axis, as shown for example in FIG. 9, and more preferably about 5 degrees, for an improved self engaging angle with a complementarily configured receptacle 58, as shown in FIG. 2, for enhanced tamper resistant qualities.

As shown in FIG. 2, the latch structure 30 can include a generally L-shaped member 54 with an end portion 56 couplable with a complementarily configured receptacle 58 for receiving the end portion 56 in a portion of a header of a container, to provide a secure lock and minimize and slow down break-ins. As should be understood, the L-shaped member 54 and receptacle 58 can have various geometry's, to accommodate various containers, depending on the application. Advantageously, this structure provides a self-engaging angle for improved locking, when in the locked position. In a preferred embodiment, this structure is made of a strong and light weight material, for ease of movement and strength, such as steel, certain polymers and composites and the like, for example. Also, the end portion 56 of the L-shaped member 54 has angled portions, to allow some movement thereof, to provide a floating door to minimize the possibility of the door and lock from binding up. Additionally, as shown in FIGS. 8 and 9, the L-shaped member 54 has a chamfered, contoured portion 45 for added engagement and length, with minimal additional weight.

Also shown in FIG. 2, the plunger assembly 34 can include an anchor frame 62 connected to the housing 12, and elongated plunger 64 slidably connected thereto. In one embodiment, the plunger assembly 34 includes an anchor frame 62 having ports 66 and 68 and a plunger 64 slidably connected thereto, the plunger 64 including a head 70, neck 72, body 74 and bottom 76, the body 74 and bottom 76 being configured to be received in the ports 66 and 68 of the anchor frame 62, respectively. This structure provides a simplified construction and contributes to the narrow profile of the housing 12, thus contributing to maximizing usage of the valuable cargo space in a container. In FIGS. 2 and 12, the head 70 is shown terminating with a large diameter, flat section 71, to provide a sufficient contact area with the C-shaped member 24 of the linkage mechanism 32. In a preferred embodiment, a spring 43 is coupled to the plunger 64, to push the plunger 64 downwardly, to stabilize the plunger 64 during transit (ie. vibration) and provide resistance when unlocking. In one embodiment, the key receptacle 18 could be replaced with an electronic actuator, such as a solenoid and rf receiver, to open and close, with a wireless transmitter, for example.

Figure 14:
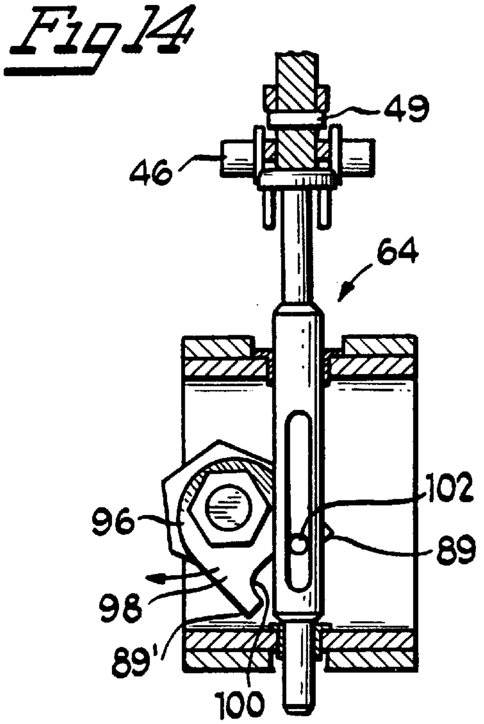
FIG. 14 is a partial view of the security system in FIG. 2 showing a partial, front view of an internal portion of the lock housing with an internal key receptacle, when in a locked position, in accordance with the present invention.

In one embodiment, as shown in FIG. 2, the proximal section 40 of the linkage 32 includes a C-shaped member (or cam assembly) 24 substantially complementarily configured to receive the head 70 of the plunger 64. In a preferred embodiment, the cam assembly 24 includes at least one top finger (or first member) 26 and two bottom fingers (or second members) 28, the head 70 is received substantially between the top 26 and bottom fingers 28 in a vertical direction in FIG. 2, and the neck 72 of the plunger 64 is received between the two bottom fingers 84 in a horizontal direction in FIG. 8. A pressed finger 49, shown in FIGS. 9 and 14, can be used to assemble the C-shaped member 24, thus providing a robust and inexpensive structure.

Advantageously, this structure provides a robust construction for improved movement of the latch structure 30 and linkage mechanism 32, in the harsh environments and temperature variations it will be exposed to.

In more detail the C-shaped member 24 provides the following advantages. It helps to substantially isolate and minimize shock to the latch structure 30 and linkage mechanism 32, to the plunger 64 and associated structure from loads and forces during transportation (ie. vibrations) and attempted break-ins. It also provides for use of a low tolerance part or interface for the plunger 64 and linkage mechanism 32, for example, which can be assembled and manufactured easily and inexpensively. In one application, the actuator 16 can be connected to the housing 12 via a cable assembly 86 in one embodiment as shown in FIG. 1, or it can be substantially located in the housing 12 in another, as shown in FIG. 2. In FIG. 3, a partial view of the lock assembly in FIG. 1 showing a side view of a remote key receptacle housing 90 is shown, with many of the components therein. FIG. 4 shows the system 10 in an unlocked position and FIG. 5 show when in a locked position. In FIGS. 3–5, the lock housing 12 can include an arm 92 pivotably connected to the anchor frame 62 via a stationary pivot pin 102, the arm 92 has a first end 96 and a second end 98, which generally defines a generally C-shaped cam member 88 pivotably connected to the housing 12, and couplable with the plunger 64 via pin 102.

In more detail, FIGS. 1 and 3–5 show the lock housing 12 (with a remote key receptacle housing 90 (in FIGS. 6 and 7). In this embodiment, the cable 48 can provide the necessary force to move the system 10 to and from the open and closed positions, as appropriate, when a key 19 is inserted into the key receptacle 18, in the remote housing 90 in FIG. 6, for example. In a preferred embodiment, the cable 48 and/or cable assembly 86, is enclosed in conduit, for enhanced protection thereof. The conduit can have an S-like pattern to minimize contamination and catching of dirt, dust and the like, and when knocked or cut-off, will pivot to a side to make it difficult to tamper with.

Likewise, in FIGS. 6 and 7 a remote key receptacle housing 90 is shown, with another arm 104 connected to a key receptacle 18, for opening and closing the system 10. This embodiment allows for easy access to the key receptacle 18 for a user, and can be appropriately positioned near a bottom of a door, and preferably adjacent to and behind a hinge of a door, for improved strength and a hidden view (camouflaged), as shown in FIGS. 2 and 10. The receptacle can include a bolt like means or plug 21 insertable in the key receptacle 18, to cover and hide the receptacle 18, to hide it from an opportunist.

The housing 12 is strategically positioned inside of and adjacent to a cargo loading door 14 such that it is substantially free from interfering with a loading and unloading operation. The placement shown in the figures is preferred so as to minimize the possibility of damage during loading and unloading of the cargo.

Figure 13:
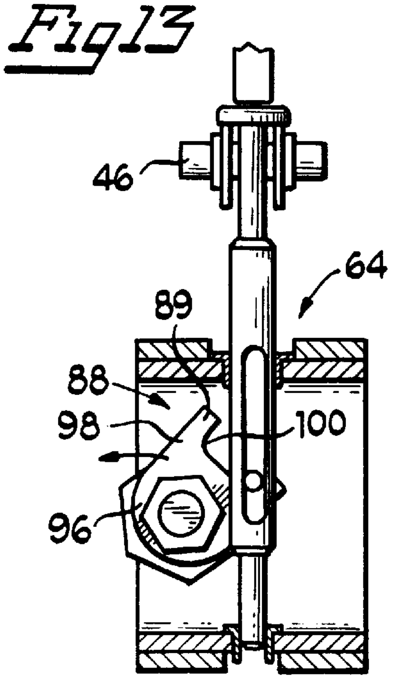
FIG. 13 is a partial view of the security system in FIG. 2 showing a partial, front view of an internal portion of the lock housing with an internal key receptacle, when in an unlocked position, in accordance with the present invention.

As best shown in FIGS. 2 and 9, detailed below is a simplified description of how the security system can be used. A key 19 is inserted through a cargo loading door 14 and key receptacle 18. The key receptacle 18 is attached to a C-shaped member (cam assembly) 88, as shown in FIGS. 2, 8 and 9. The C-shaped member 88 is rotated clockwise, as viewed in FIGS. 8 and 14 (arrow). As shown in FIG. 8, an upper member 89 catches and contacts a cross-pin 87. The cross-pin 87 is thus moved downward. The cross-pin 87 is connected to a plunger 64. The plunger 64 slides downwardly, due in part to the cross-pin 87 being connected to the plunger 64. In a preferred embodiment, the cross-pin 87 is encapsulated in a slot, thus the plunger 64 does not rotate, during movement. Next, a head 70 of the plunger 64 makes contact with fingers 28 of the C-shaped member 24. The C-shaped member 24 rotates about a stationary pivot 42, and makes contact with a pin 49 affixed to a proximal section 40 of the linkage assembly 32. The proximal section 40 then rotates with the C-shaped member 24 about the same pivot 46. The distal section 38 moves outward and due to the connection between the proximal section 40, and thus the linkage mechanism 32 articulates to a slight angle, as shown in FIG. 9, (in dashed line shows an inner surface 53 at an angle of about five degrees from a vertical axis). Thus, the L-shaped member 54 pivots about the housing 12 and rotates upward to a locked position. Refering to FIG. 2, detailed below is a simplified description of how the security system can be used and moved to an unlocked position. A key 19 is inserted through a door 14 and key receptacle 18. The C-shaped member 88 is rotated counter clockwise, as shown in FIG. 13 (arrow). In FIG. 13, a second lower member 89' catches and contacts the cross-pin 102. The cross-pin 102 is moved in an upward direction. The cross-pin 102 is connected to a plunger 64. The plunger 64 slides upwardly, because it is connected to the plunger 64. Next, the flat portion 71 of the head makes contact with the first member 26 of the proximal section 40. In FIG. 2, the proximal section 40 pivots about the stationary pin rotating clockwise. The proximal section pivots until making contact with a (backstop) bumper 51. The distal section 38 then drops and rotates downward. Since it is connected to the L-shaped member 54, it pivots about stationary pivot pin 55 in FIG. 2, and housing 12 and rotates downward to the unlocked position.

Referring to FIGS. 1 and 3–7, detailed below is a simplified description of how the security system can be used and moved to an unlocked position, with a remote actuator 16. A key 19 is inserted through a door and remote key receptacle 18. The key receptacle 18 is attached to an arm 104, in FIG. 6. The arm 104 in FIG. 6 is rotated clockwise (arrow in figure). The arm 104 is connected to the cable 48, which can be moved up or down. The cable 48 at the other end is connected the C-shaped member 88, in FIGS. 3–5. The C-shaped member 88 pivots about the (spindle) pin 102, which is rotated counter clockwise, to move to the unlocked position. The remaining steps are substantially similar, as detailed above.

Although various embodiments of the invention have been shown and described, it should be understood that various modifications and substitutions, as well as rearrangements and combinations of the preceding embodiments, can be made by those skilled in the art.

What is claimed is:

1. A security system for cargo loading doors, comprising:
   - a substantially narrow profile housing adapted to being connected to an inside of a cargo loading door;
   - an actuator having a key receptacle, for moving a latch structure between a locked position and an unlocked position;
   - the latch structure and the actuator being coupled by a linkage mechanism and plunger assembly, the latch structure is adapted to be at least partially received in a header of a cargo carrying enclosure, when the latch structure is in the locked position and withdrawn from the header when the latch structure is in the unlocked position;
   - the linkage mechanism includes a distal section and a proximal section connected by a middle pivot pin, the distal section is coupled to the latch structure with an upper pivot pin and the proximal section is coupled with the plunger assembly, the proximal section is also pivotably connected to the housing with a stationary pivot pin, the linkage mechanism defines a simulated rigid link defined by the proximal section and distal section being substantially aligned when the latch structure is in the locked position; and a base plate with an upwardly extending male member and substantially outwardly extending anchor members and the housing further including (i) a bracket slidably connectable to the upwardly extending male member and (ii) snap-fitable members connectable to the outwardly extending anchor members of the base plate.

2. The security system of claim 1, wherein the snap-fitable members are spring loaded locking members.

3. The security system of claim 1, wherein at least one of the proximal and distal sections includes a stopper mechanism for aligning the linkage mechanism to provide a substantially rigid link when the latch structure is in the locked position, the stopper mechanism aligns the proximal section with the distal section slightly beyond center from a straight line, defining a slight angle of about 15 degrees or less from a straight line and providing a simulated rigid link of.

4. The security system of claim 1, wherein the latch structure includes a generally L-shaped member with an end portion couplable with a complementarily configured receptacle for receiving the end portion in a portion of a header of a container, to provide a self-engaging angle for a lock.

5. The security system of claim 1, wherein the plunger assembly includes an anchor frame connected to the housing and plunger slidably connected thereto.

6. The security system of claim 1, wherein the plunger assembly includes an anchor frame having ports and a plunger slidably connected thereto, the plunger including a head, neck, body and bottom, the body and bottom being configured to be received in the ports of the anchor frame, and a spring coupled to the body of the plunger and an upper port of the anchor frame.

7. The security system of claim 1, wherein the plunger assembly includes an anchor frame having ports and plunger slidably connected thereto, the plunger includes a head, neck, body and bottom, the body and bottom being configured to be received in the ports of the anchor frame and the head having a diameter sufficient to contact the linkage.

8. The security system of claim 1, wherein the proximal section of the linkage includes a cam assembly substantially complementarily configured to receive a head of a plunger.

9. The security system of claim 1, wherein the proximal section of the linkage includes a cam assembly substantially complementarily configured to receive a head of a plunger, the cam assembly includes at least one top finger and two bottom fingers, the head is received substantially between the top and bottom fingers, and a neck of the plunger is received between the two bottom fingers.

10. The security system of claim 1, wherein the actuator is connected to the housing via a cable assembly.

11. The security system of claim 1, wherein the actuator is substantially located in the housing.

12. The security system of claim 1, wherein the actuator includes a generally C-shaped member pivotably connected to the housing, coupled to the plunger.

13. A security system for cargo loading doors, comprising:

a substantially narrow profile housing adapted to being connected to an inside of a cargo loading door;

an actuator having a key receptacle, for moving a latch structure between a locked position and an unlocked position;

the latch structure and the actuator being coupled by a linkage mechanism and plunger assembly, the latch structure is adapted to be at least partially received in a header of a cargo carrying enclosure, when the latch structure is in the locked position and withdrawn from the header when the latch structure is in the unlocked position;

the linkage mechanism includes a distal section and a proximal section connected by a middle pivot pin, the distal section is coupled to the latch structure with an upper pivot pin and the proximal section is coupled with the plunger assembly, the proximal section is also pivotably connected to the housing with a stationary pivot pin, the linkage mechanism defines a simulated rigid link defined by the proximal section and distal section being substantially aligned when the latch structure is in the locked position;

at least one of the proximal and distal sections includes a stopper mechanism for aligning the linkage mechanism to provide a substantially rigid link when the latch structure is in the locked position, the stopper mechanism aligns the proximal section with the distal section slightly beyond center from a straight line, defining a slight angle of about 15 degrees or less from a straight line and providing a simulated rigid link;

the plunger assembly includes an anchor frame connected to the housing and plunger slidably connected thereto, the plunger assembly includes an anchor frame having ports and a plunger slidably connected thereto, the plunger including a head, neck, body and bottom, the body and bottom being configured to be received in the ports of the anchor frame;

the proximal section of the linkage includes a cam assembly substantially complementarily configured to receive a head of a plunger;

the cam assembly includes at least one top finger and two bottom fingers, the head is received substantially between the top and bottom fingers, and a neck of the plunger is received between the two bottom fingers, and a base plate with an upwardly extending male member and substantially outwardly extending anchor members and the housing further including (i) a bracket slidably connectable to the upwardly extending male member and (ii) snap-fitable members connectable to the outwardly extending anchor members of the base plate.

14. The security system of claim 13, wherein the latch structure includes a generally L-shaped member with an end portion couplable with a substantially complementarily configured receptacle for receiving the end portion in a portion of a header of a container, to provide a secure lock.

15. The security system of claim 13, wherein the proximal section of the linkage includes a cam assembly substantially complementarily configured to receive a head of a plunger.

16. The security system of claim 13, wherein the actuator is at least one of connected to the housing via a cable assembly and is substantially located in the housing.

17. The security system of claim 13, wherein the actuator includes a generally C-shaped member pivotably connected to the housing, coupled to the plunger.

18. The security system of claim 13, wherein the snap-fitable members are spring loaded locking members.

* * * * *